(12) United States Patent
Biais et al.

(10) Patent No.: US 7,051,421 B2
(45) Date of Patent: *May 30, 2006

(54) METHOD OF FABRICATING A ROTOR

(75) Inventors: Francois J. Biais, Chatou (FR);
Khwaja M. Rahman, Torrance, CA (US)

(73) Assignee: General Motors Corporation, Detroit, MI (US)

( * ) Notice: Subject to any disclaimer, the term of this patent is extended or adjusted under 35 U.S.C. 154(b) by 292 days.

This patent is subject to a terminal disclaimer.

(21) Appl. No.: 10/431,744

(22) Filed: May 8, 2003

(65) Prior Publication Data

US 2003/0173852 A1 Sep. 18, 2003

Related U.S. Application Data

(62) Division of application No. 10/087,236, filed on Mar. 1, 2002, now Pat. No. 6,703,746.

(51) Int. Cl.
*H02K 15/00* (2006.01)
*H02K 15/14* (2006.01)
*H02K 15/16* (2006.01)

(52) U.S. Cl. .................. 29/596; 29/419.1; 29/419.2; 29/508; 29/607; 29/608; 310/43; 310/156.43; 310/156.53; 335/284

(58) Field of Classification Search ............... 29/596, 29/419.1, 419.2, 598, 607, 608; 310/43, 310/156.43, 156.53; 335/284
See application file for complete search history.

(56) References Cited

U.S. PATENT DOCUMENTS

| | | | |
|---|---|---|---|
| 6,177,745 B1 * | 1/2001 | Narita et al. | 310/156.53 |
| 6,274,960 B1 * | 8/2001 | Sakai et al. | 310/156.02 |
| 6,816,048 B1 * | 11/2004 | Morita et al. | 335/220 |

* cited by examiner

*Primary Examiner*—A. Dexter Tugbang
*Assistant Examiner*—Tim Phan
(74) *Attorney, Agent, or Firm*—Christopher DeVries

(57) ABSTRACT

An electric traction motor for a vehicle including a housing, a wound stator field located in the housing, a rotor magnetically interacting with the wound stator field, high energy magnets configured in the rotor, and low energy magnets configured in the rotor.

5 Claims, 2 Drawing Sheets

METHOD OF FABRICATING A ROTOR

CROSS REFERENCE TO RELATED DOCUMENT

The present application is a division of application Ser. No. 10/087,236, filed on Mar. 1, 2002, now U.S. Pat. No. 6,703,746.

TECHNICAL FIELD

The present invention relates generally to electric or hybrid electric vehicle propulsion systems. More specifically, the present invention relates to the design of electric traction motors or machines for use in electric or hybrid vehicles.

BACKGROUND OF THE INVENTION

In today's automotive market, there exists a variety of electric propulsion or drive technologies used to power vehicles. The technologies include electric traction motors such as DC motors, AC induction motors, switched reluctance motors, synchronous reluctance motors, brushless DC motors and corresponding power electronics. Brushless DC motors are of particular interest for use as traction motors in an electric vehicle because of their superior performance characteristics, as compared to DC motors and AC induction motors. Brushless DC motors typically operate with a permanent magnet rotor. A permanent magnet rotor may be configured as a surface mount or interior/buried permanent magnet rotor. An interior permanent magnet (IPM) motor or machine has performance attributes, when compared to DC motors and AC induction motors, that include relatively high efficiency, relatively high torque, relatively high power densities, and a long constant power operating range which make an IPM machine attractive for vehicle propulsion applications.

Permanent magnets buried inside a rotor for a brushless DC motor exhibit high reluctance directly along the magnetic axis or the d-axis due to the low permeability of the permanent magnets. While along the q-axis, between the magnetic poles or magnetic barriers of an IPM rotor, there is no magnetic barrier and reluctivity to magnetic flux is very low. This variation of the reluctance around the rotor creates saliency in the rotor structure of an IPM machine. Therefore, the IPM rotors have reluctance torque in addition to the permanent magnet torque generated by the magnets buried inside the rotor. Reluctance in the d-axis can be created by one magnet such as found in a single barrier rotor design.

A single magnet of the one barrier rotor design can also be split into several layers creating a multi-barrier design. The multi-barrier design reduces leakage and improves the rotor saliency. Accordingly, motors having multi-barrier rotors have numerous performance advantages over a single barrier rotor design, including relatively high overall efficiency, extended high speed constant power operating range, and improved power factor. Improved saliency of the multi-barrier rotor helps to lower the amount of magnets or magnetic material in an IPM machine, as compared to a single barrier IPM machine or surface-mounted permanent magnet machine, by reducing dependency on magnetic torque. The amount of magnetic material needed to generate a specific torque and wattage rating depends on the level of saliency of the rotor. The higher the rotor saliency, the lower the magnetic material usage for the same overall machine performance. Electric motors having a multi-barrier rotor design, as compared to single barrier design, generate higher rotor saliency.

Magnets in an IPM machine can be pre-magnetized and then inserted inside the rotor. This magnet insertion is a complex and relatively costly step that adds manufacturing steps to the assembly of the IPM machine.

Post-magnetization of inserted magnetic material is possible if the magnets are inserted near the rotor surface. For post-magnetization, magnetic material may be preformed outside of the rotor, inserted into the rotor, and then magnetized. This is usually the case with sintered magnets, which require a certain orientation. A further type of magnetic material used that may be used in an IPM rotor is bonded magnets, which are usually mixed with a plastic, such as PPS, and may also be preformed outside of the rotor and then inserted into the rotor. However, generally bonded magnetic material is injected into the rotor cavities under high temperature and pressure.

Electric motors having multi-layer buried magnets in their rotors, as shown in FIG. 2, exhibit excellent performance characteristics for vehicle propulsion application. The problems associated with post-magnetizing high energy magnetic material in such a barrier or rotor geometry would result in a large amount of magnetic material buried deep within the rotor that may only partially magnetize or not magnetize at all. The strength of a magnet is typically defined by the magnetic energy product (MEP). MEP is proportional to the product of magnetic remnant flux density, $B_r$, and the coercivity, $H_c$. MEP is measured in units of energy per unit volume. High energy magnetic material needs a relatively high magnetizing field during the magnetizing process. In present post-magnetization processes, the magnetizing field has difficulty reaching deep in the rotor because of the saturation of the magnetic circuit. Post-magnetization works efficiently for high energy magnetic material buried or located near the surface of the rotor, but for high energy magnetic material buried relatively deep in the rotor, post-magnetization is difficult due to the weakening of the magnetizing field.

SUMMARY OF THE INVENTION

The present invention includes a method and apparatus for the design of an IPM machine rotor. The present invention varies the type and strength of magnetic material in different regions of the rotor. In one embodiment of the present invention, NdFeB material or other high energy magnetic materials are configured in the entire outer barrier of the rotor of FIG. 2 where they may be easily magnetized. However, high energy magnetic material in the middle section or the inner regions of the rotor may not be exposed to a magnetizing field strong enough to fully magnetize a high energy magnetic material. In the present invention, low energy magnetic material is placed in those areas of the rotor that are difficult to magnetize, as they require a relatively smaller magnitude magnetizing field, as compared to the high energy magnetic material. Accordingly, the low energy magnetic material in the inner region may be fully magnetized. Low energy magnets in the inner region do not contribute to the air gap flux. However, the low energy magnets ensure bridge saturation, which is important to ensure high saliency corresponding to better performance. A non-magnetized high energy magnet in the inner region may contribute to a waste of valuable magnetic material and also inadequate bridge saturation. This inadequate bridge saturation will lower the rotor saliency and motor performance.

DESCRIPTION OF THE PREFERRED EMBODIMENT

U.S. Ser. No. 09/952,319, assigned to assignee of this invention, includes a detailed description of multi-layer motor geometry and is hereby incorporated by reference in its entirety.

Figure 1:
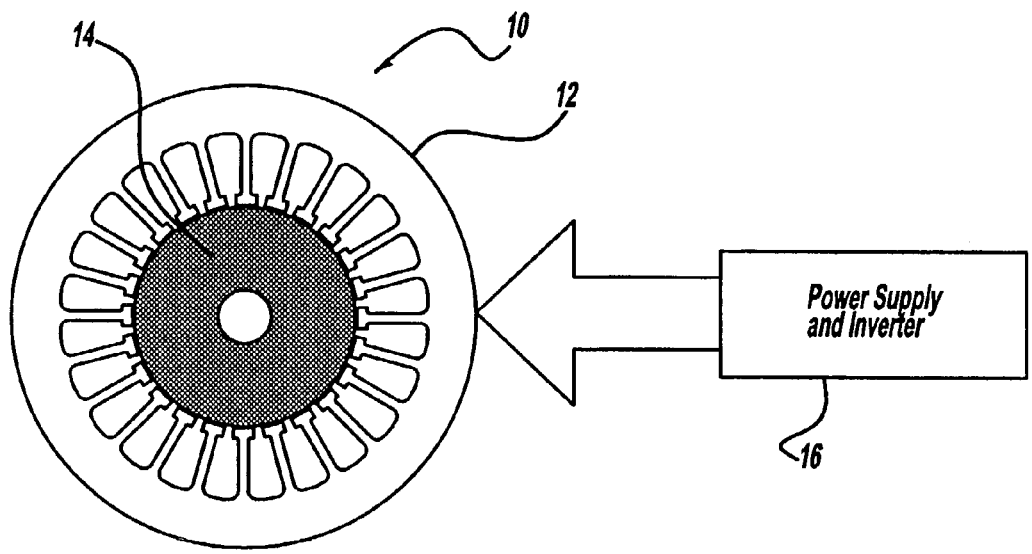
FIG. 1 is a diagrammatic cross-sectional drawing of a permanent magnet motor and control system.

FIG. 1 is a diagrammatic drawing of a permanent magnet motor 10 having a wound stator 12 and permanent magnet rotor 14. A power supply and inverter 16 commutate and control the speed and torque of the motor 10 in response to feedback including, but not limited to, an encoder, resolver, tachometer, proximity switch and tooth set, and back electromotive force (emf) detection. The motor may be characterized as a brushless DC motor with square wave or sinewave excitation provided by the power supply and inverter 16.

Figure 2:
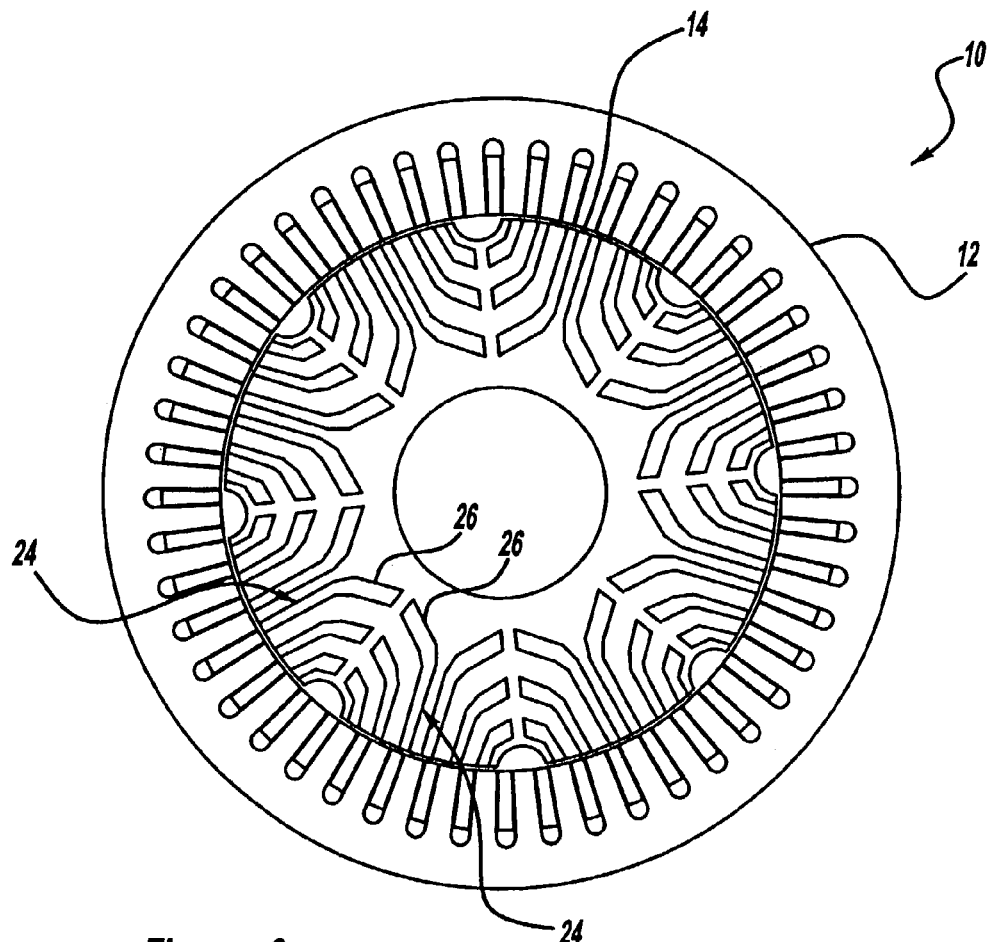
FIG. 2 is a cross section of a multi-layer interior or buried magnet motor geometry.

FIG. 2 is a cross section of a multi-layer or barrier buried magnet rotor geometry. Regions 26 of the magnetic material layers or barriers 24 will be difficult to fully magnetize because of the distance from the rotor 14 surface. The magnetic material layers 24 surface may be magnetized by a magnetizing fixture or the wound stator 12 during a post-magnetization process. The post-magnetization process in one embodiment of the present invention includes positioning a magnetizing fixture around the rotor 14 to magnetize the magnetic material in the rotor 14. Magnetizing fixtures similar to the stator 12 contain windings which are used for the magnetization process. The stator 12 may also be used to magnetize the rotor 14 instead of a magnetizing fixture in alternate embodiments of the present invention. The magnetizing fixture includes enough iron to prevent it from becoming saturated. Windings in the magnetizing fixture are placed such that the magnetic field is guided along a desired magnetization direction.

In a preferred embodiment of the present invention, magnetic powder mixed with plastic may be injected into the rotor 14 cavities under high temperature and pressure, allowing the material to bond and form inside the rotor 14 cavity. This process is desirable for large scale production. As mentioned earlier, post-magnetization of high energy magnetic material is currently only practical if the magnetic material is buried near the rotor surface.

Magnetic material, depending on its composition, requires varying magnetic field strengths to become fully magnetized. The high energy magnets which are preferred for variable speed motor drive applications due to their higher demagnetization strength require very high magnetic fields to saturate the magnetic material to become fully magnetized. The magnetic field is produced by the flow of current in the stator 12 winding or in a magnetizing fixture. Usually, a very high current burst is needed for a very short period of time to magnetize the rotor 14. If the stator 12 lacks sufficient iron, it may become saturated during this process, preventing the generated magnetic field from penetrating into the rotor 14.

As described previously, multi-layer or barrier geometry for an IPM rotor improves the rotor 14 saliency. Accordingly, the rotor 14 geometry of FIG. 2 has the advantage of having relatively high saliency, improving the machine torque density and lowering the magnetic material volume requirements for a specific torque or wattage motor rating. Lower magnetic material volume requirements reduce the motor cost and also alleviate the problems associated with high flux PM machines, such as short circuit and open circuit fault problems, and spin losses (eddy current induced losses) due to the presence of the permanent magnet field.

Figure 3:
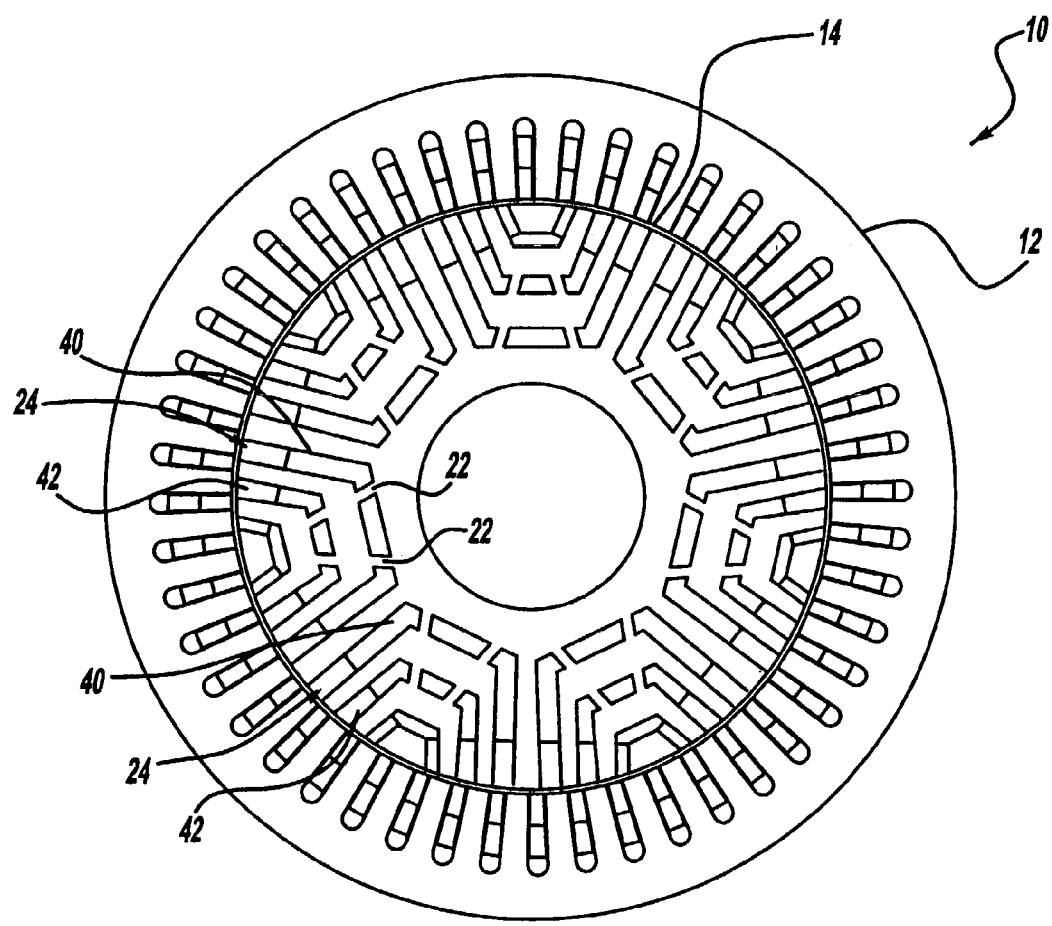
FIG. 3 is a cross section of a multi-layer interior or buried magnet motor with bottom barriers filled with low energy magnetic material and upper barriers filled with high energy magnetic material.

FIG. 3 is a cross section of a multi-layer or barrier buried magnet motor 10 with bottom barriers filled with low energy magnetic material 40 and upper barriers filled with high energy magnetic material 42. The present invention removes high energy magnetic material from areas of the rotor 14, such as regions 26 in FIG. 2, where it is difficult to magnetize the high energy magnetic material and replaces the high energy magnetic material with a low energy magnetic material. The high energy magnetic material 42 may comprise a material requiring a magnetizing field more than 2000 kA/m to become magnetized. The low energy magnetic material 40 may comprise a material requiring a magnetizing field less than 2000 kA/m. Low coercivity of the low energy magnetic material 40 allows easier magnetization. In the preferred embodiment of the present invention, the high energy magnetic material 42 is NdFeB and the low energy magnetic material 40 is ferrite, but any other high energy or low energy magnetic material is considered within the scope of the present invention.

The low energy magnetic material 40 placed near the center of the rotor 14 can be fully magnetized by the magnetizing fixture because of its lower magnetizing field. The main performance contribution of the magnetic material 40 is to saturate the bridges 22 between barriers 24 and therefore ensure the saliency of the rotor 14. These bridges 22 also ensure the mechanical strength of the rotor 14. The mechanical strength of the low magnetic material 40 that is placed near the center of the rotor is sufficient to fulfill this function.

While this invention has been described in terms of some specific embodiments, it will be appreciated that other forms can readily be adapted by one skilled in the art. Accordingly, the scope of this invention is to be considered limited only by the following claims.

The invention claimed is:

1. A method of fabricating a rotor for an electric traction motor comprising the steps of:

forming cavities in the rotor;

injecting high energy magnetic material in a portion of the cavities;

injecting low energy magnetic material in a portion of the cavities; and post-magnetizing the magnetic material using a wound stator of the electric traction motor.

2. The method of claim 1 further comprising the step of bonding said high energy and low energy magnetic material with a plastic.

3. A method of fabricating an electric traction motor comprising:

providing a stator for the electric traction motor;

providing a rotor for the electric traction motor;

forming cavities in the rotor;
injecting high energy magnetic material in a portion of the cavities;
injecting low energy magnetic material in a portion of the cavities; and
postmagnetizing the magnetic material with the stator.

4. The method of claim 3 further comprising bonding said high energy and low energy magnetic material with a plastic.

5. The method of claim 3 further comprising energizing said high energy magnets with a magnetizing field of more than 2000 kA/m.

* * * * *